(12) United States Patent
Javidi

(10) Patent No.: US 7,212,630 B2
(45) Date of Patent: May 1, 2007

(54) METHOD AND APPARATUS FOR ENCRYPTION USING PARTIAL INFORMATION

(75) Inventor: Bahram Javidi, Storrs, CT (US)

(73) Assignee: University of Connecticut, Storrs, CT (US)

(*) Notice: Subject to any disclaimer, the term of this patent is extended or adjusted under 35 U.S.C. 154(b) by 850 days.

(21) Appl. No.: 10/318,841

(22) Filed: Dec. 13, 2002

(65) Prior Publication Data

US 2003/0152227 A1    Aug. 14, 2003

Related U.S. Application Data

(62) Division of application No. 09/204,541, filed on Jan. 29, 1999, now Pat. No. 6,519,340.

(60) Provisional application No. 60/078,254, filed on Mar. 17, 1998.

(51) Int. Cl.
*H04L 9/00* (2006.01)

(52) U.S. Cl. .................. 380/28; 380/201; 380/210; 380/216

(58) Field of Classification Search ............ 380/201, 380/210, 216, 28
See application file for complete search history.

(56) References Cited

U.S. PATENT DOCUMENTS

| | | | |
|---|---|---|---|
| 3,679,821 A | 7/1972 | Schroeder | 178/6 |
| 4,393,276 A | 7/1983 | Steele | 179/1.5 |
| 4,558,462 A | 12/1985 | Horiba et al. | 382/42 |
| 5,072,314 A | 12/1991 | Chang | 359/559 |
| 5,214,534 A * | 5/1993 | Kallman et al. | 359/561 |
| 5,315,668 A | 5/1994 | O'Hair | 382/14 |
| 5,485,312 A | 1/1996 | Horner et al. | 359/561 |
| 5,639,580 A | 6/1997 | Morton | 430/11 |
| 5,689,372 A | 11/1997 | Morton | 359/623 |
| 5,703,970 A | 12/1997 | Atashroo | 382/278 |

(Continued)

OTHER PUBLICATIONS

La Photographic Integrale, Comptes Rendus 146, 446-451, Academic des Sciences (1908).

(Continued)

*Primary Examiner*—Emmanuel L. Moise
*Assistant Examiner*—Paul Callahan
(74) *Attorney, Agent, or Firm*—Cantor Colburn LLP

(57) ABSTRACT

A method and apparatus of encrypting optical images using binarization or phase only information is presented with a number of ways to secure the image also being provided. An image to be encrypted is first multiplied by a random phase function. The Fourier transform of the product of the image and the random phase function is then multiplied by another random phase function in the Fourier (or Fresnel) domain. Taking the inverse Fourier (or Fresnel) transform, an encrypted image in the output plane is obtained. Alternatively, the image to be encrypted can be phase encoded and then encrypted to provide an extra level or security. The image can be secured using one key in the Fourier or Fresnel domain followed by phase extraction. This encrypted image may then binarized, which may include binarizing the phase-only part of the encrypted image. The use of binarization enables ease of implementation and data compression while still providing recovery of images having good quality. The original image may be recovered from the phase-only part of the encrypted image, the binarized encrypted image, or the binarized phase-only part of the encrypted image.

8 Claims, 5 Drawing Sheets

U.S. PATENT DOCUMENTS

| | | | |
|---|---|---|---|
| 5,712,912 A | 1/1998 | Tomko et al. | 380/23 |
| 5,740,276 A | 4/1998 | Tomko et al. | 382/210 |
| 5,828,495 A | 10/1998 | Schindler | 359/621 |
| 5,835,194 A | 11/1998 | Morton | 355/22 |
| 5,867,322 A | 2/1999 | Morton | 359/619 |
| 5,892,597 A | 4/1999 | Iwata et al. | 359/11 |
| 5,903,648 A | 5/1999 | Javidi | 380/10 |
| 5,933,228 A | 8/1999 | Taylor et al. | 356/124 |
| 5,956,083 A | 9/1999 | Taylor et al. | 348/231 |
| 5,959,718 A | 9/1999 | Morton | 355/22 |
| 6,028,719 A | 2/2000 | Beckstead et al. | 359/725 |
| 6,046,848 A | 4/2000 | Gulick, Jr. | 359/463 |
| 6,219,794 B1 | 4/2001 | Soutar et al. | 713/202 |

OTHER PUBLICATIONS

"Three-dimensional Imaging of Random Radiation Sources," Opt. Lett vol.. 21 No. 14, pp. 1011-1013 (1996), J. Rosen and A. Yariv.

"Retrieval of the Cross-Spectral Density Propagating in Fee Space," J. Opt. Soc. Am. A 16, 2447-2452 (1999), H. Arimoto, K. Yoshimori, and Itoh.

"Passive Interferometric 3-D Imaging and Incoherence Gating," Opt. Commun. 170, 319-329 (1999), H. Arimoto, K. Yoshimori, and K. Itoh.

"Real-time Transmission of 3-D Images Formed by Parallax Panoramagrams," Appl. Opt. 17, 3895-3902 (1978), H. Higuchi and J. Hamasaki.

"Real-time Pickup Method for A Three-dimensional Image Based on Integral Photography," App. Opt. 36, 1598-1603 (1997), F. Okano, H. Hoshino, J. Arai, and I. Yuyama.

Gradient-index Lens-array Method Based on Real-time Integral Photography for Three-dimensional Images, Appl. Opt. 37, 2034-2045 (1998), J. Arai, F. Okano, H. Hoshino, and I. Yuyama.

Encrypted Optical Storage With Angular Multiplexing", Journal of Applied Optics, vol. 38, pp. 7288-7293, Dec. 10, 1999, O. Matoba and B. Javidi.

"Encrypted Optical Storage With Wavelength Key and Random Phase Codes", Journal of Applied Optics, vol. 38, pp. 6785-6790, Nov. 10, 1999, O. Matoba and B. Javidi.

"Analysis of Resolution Limitation of Integral Photography," J. Opt. Soc. Am. A 15, 2059-2065 (1998), H. Hoshino, F. Okano, H. Isono and I. Yuyama.

"Three-dimensional Video System Based on Integral Photography," Opt. Eng. 38, 1072-1077 (1999) F. Okano, J. Arai, H. Hoshino and I. Yuyama.

Three-dimensional Video and Display: Devices and Systems Bahram Javidi and Fumio Okano, Information Technology 2000. Proceedings of the SPIE, vol. CR 76, Boston (entire book).

"Optical pattern recognition for validation and security verification;"B. Javidi and J. Horner; Optical Engineering, Jun. 1994.

Introduction to Fourier Optics, Chapter 9 (McGraw-Hill, New York. 1996), J.W. Goodman, pp. 295-341.

"Real-Time Optical Information Processing," Academic Press 1994, Bahram Javidi, Chapter 4, pp. 115-183.

Computer Generated Integral Photography. Sixth International Workshop on Three-dimensional Imaging Media Technology Seoul Korea pp. 21-28. Sung-Wook Min, Sungyong Jung, Jae-Hayyeung Park, and Byoungho Lee.

Encrypted optical memory system using three-dimensional keys in the Fresnel domain, 1999 Optical Society of America, p. 762-764, Jun. 1, 1999, Osamu Matoba and Bahram Javidi.

Encrypted optical storage with wavelength-key and random phase codes—Osamu Matoba and Bahram Javidi, 1999 Optical Society of America—vol. 38.

Three-dimensional object recognition by use of digital holography-Optics letter, vol. 25, No. 9, May 1, 2000, Bahram Javidi and Enrique Tajahueree, pp. 610-612.

Integral 3D Imaging for Broadcast; M. McCormick.

Integral three-dimensional imaging with digital reconstruction. Journal of Optics Letters. vol. 26, No. 3, Feb. 1, 2001, H. Arimoto and Bahram Javidi, p. 157-159.

"Integral three-dimensional imaging system by digital image processing," Critical Review of Technology of Three Dimensional Video and Display: Systems and Devices. Information Technology 2000. Proceedings of the SPIE, vol. CR 76, Photonics East, Boston, Nov. 2000, H. Arimoto and B. Javidi.

"Optical image encryption based on input plane and Fourier plane random encoding," Ph. Refregier and B. Javidi; Optics Letters, vol. 20, No. 7, Apr. 1, 1995.

"Encrypted data storage based on orthogonal phase-code multiplexing in volume holography," in CLEO'95 Opt.Soc.Amer., May 1995, Paper Cth132, pp. 308-309, J.F. Heanuet et al.

"Optical pattern recognition for validation and security verification," Jun. 1997, vol. 33, No. 6; pp. 767-769, Bahram Javidi, Joseph L. Horner.

* cited by examiner

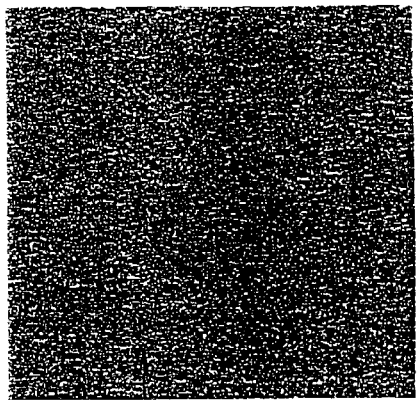
FIG. 2A
FIG. 2B
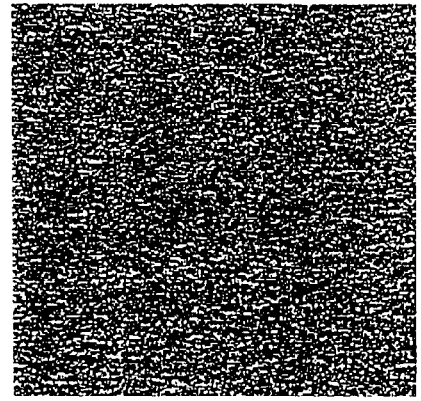
FIG. 2C
FIG. 2D
FIG. 2E
FIG. 2F

METHOD AND APPARATUS FOR ENCRYPTION USING PARTIAL INFORMATION

CROSS REFERENCE TO RELATED APPLICATIONS

This application is a divisional application of Ser. No. 09/204,541 filed on Jan. 29, 1999 now U.S. Pat. No. 6,519,340, which claims the benefit of U.S. Provisional Application Ser. No. 60/078,254 filed Mar. 17, 1998 which is incorporated herein by reference.

FIELD OF THE INVENTION

The present invention relates to encryption. More specifically, the present invention relates to a novel method and apparatus of encryption using binarization and phase information of encrypted data in terms of display or transmission of encrypted data.

BACKGROUND OF THE INVENTION

Image data security has recently become an important issue. An image is generally a two-dimensional data. In accordance with which, a one-dimensional signal or two-dimensional image may need encryption in many applications for security reasons. Also, encryption of memory, which may comprise one or more images, can be considered. Furthermore, optical security and encryption methods using random phase encoding have been proposed recently, see generally "Optical pattern recognition for validation and security verification", by B. Javidi and J. L. Horner, Opt. Eng. 33, 1752–1756 (1994). Also see, "Experimental demonstration of the random phase encoding technique for image encryption and security verification", by B. Javidi, G. Zhang and J. Li, Optical Engineering, 35, 2506–2512, 1996; "Fault tolerance properties of a double phase encoding encryption technique", by B. Javidi, A. Sergent, G. Zhang, and L. Guibert, Optical Engineering, 36(4), 992–998, 1997; "Practical image encryption scheme by real-valued data", by Yang, H.-G., and E.-S. Kim, Optical Engineering, 35(9), 2473–2478, 1996; "Random phase encoding for optical security, by Wang, R. K., I. A. Watson, and C. Chatwin", Optical Engineering, 35(9), 2464–2469, 1996; "Optical implementation of image encryption using random phase encoding", by Neto, L. G. Y. Sheng, Optical Engineering, 35(9), 2459–2463, 1996; and "Optical image encryption using input and Fourier plane random phase encoding" by Ph. Refregier and B. Javidi, Optics Letters, Vol. 20, 767–770, 1995.

SUMMARY OF THE INVENTION

The above-discussed and other drawbacks and deficiencies of the prior art are overcome or alleviated by the method and apparatus of encrypting optical images using binarization and phase information. An image to be encrypted is first multiplied by a key, e.g., a random phase function. The Fourier transform of the product of the image and the random phase function is then multiplied by another key, e.g., another random phase function in the Fourier domain. Taking the inverse Fourier transform, an encrypted image in the output plane is obtained. In accordance with the present invention, this encrypted image is then binarized, which may include binarizing the phase-only part of the encrypted image. The use of binarization enables ease of implementation and data compression while still providing recovery of images having good quality. In addition, the phase of the encrypted image only can be use for description, which makes it easier to display the encryption using techniques such as embossing.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

FIG. 2A is an original binary text image;

FIG. 2B is an original grayscale face image;

FIG. 2C is a recovered text image from amplitude-only information of an encrypted image of the image of FIG. 2A;

FIG. 2D is a recovered face image from amplitude-only information of an encrypted image of the image of FIG. 2B;

FIG. 2E is a recovered text image from phase-only information of the encrypted image of the image of FIG. 2A;

FIG. 2F is a recovered face image from phase-only information of the encrypted image of FIG. 2B;

FIG. 6A is an image decrypted from binarized phase information of the encrypted image of the image of FIG. 2A which has been further processed using a lowpass filter;

FIG. 6B is an image decrypted from binarized reconstructed complex image information of the image of FIG. 2A using a lowpass filter;

FIG. 6C is an image decrypted from binarized phase information of the encrypted image of the image of FIG. 2A which has been further processed using a spatial averaging filter of length 3×3 pixels; and FIG. 6D is an image decrypted from binarized reconstructed complex image information of the image of FIG. 2A which has been further processed using a spatial averaging filter of length 3×3 pixels.

DESCRIPTION OF THE PREFERRED EMBODIMENT

Figure 1A:
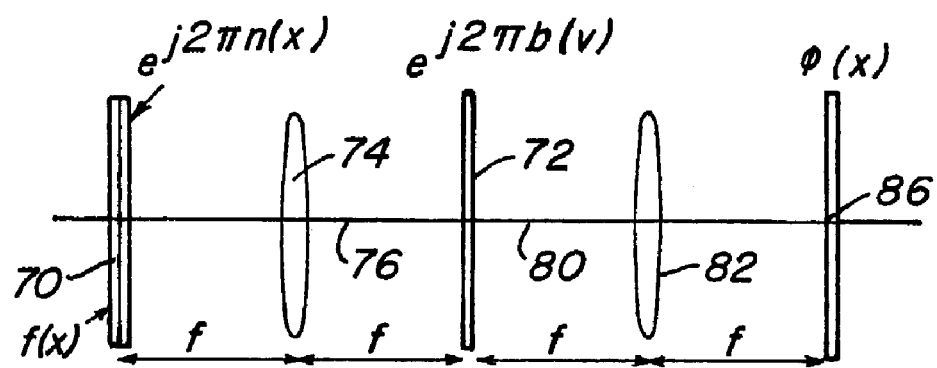
FIG. 1A is a schematic diagram of an optical assembly for use in the encryption technique of the present invention.

Generally, an encryption technique using random phase encoding in both the input plane and the Fourier plane is presented, also see U.S. patent application Ser. No. 08/595, 873 entitled Method and Apparatus For Encryption by B. Javidi, filed Feb. 6, 1996, which is incorporated by reference. More specifically, each stored image is encrypted and can be read out by a unique code or a universal code. In accordance with this exemplary method, the image to be encrypted is first multiplied by a random phase function. The Fourier transform of the product of the image and the random phase function is then multiplied by another random phase function in the Fourier domain. Taking the inverse Fourier transform, an encrypted image in the output plane is obtained which is then binarized (see, e.g., "Real-Time Optical Information Processing", by B. Javidi and J. L. Horner, Academic Press, Ch. 4 (1994) and "The Computer In Optical research and Methods" B. R. Frieden ed., Ch. 6, "Computer Generated Holograms", by W. J. Dallas, Springer Verlog, Berlin (1980), which are incorporated herein by reference in their entirety) and stored. The encrypted memory is a stationary white noise if the two encrypting random phase functions are two independent white sequences uniformly distributed on $[0, 2\pi]$, e.g., see "Optical image encryption based on input plane and Fourier plane random encoding," by Ph. Refregier and B. Javidi, Opt. Lett., 20(7), (1995), which is incorporated herein by reference in its entirety. This makes it very difficult to decrypt the memory without the knowledge of the phase functions used in the encryption, see "Optical image encryption based on input plane and Fourier plane random encoding," by Ph. Refregier and B. Javidi, Opt. Lett., 20(7), (1995), Probability, Random Variable, and Stochastic Processes, by A. Papoulis, 2nd edition, McGraw-Hill, New York (1984) and "Performance of a double phase encoding, encryption technique using binarized encrypted images" by B. Javidi, A. Sergant and E. Ahouzi, Optical Engineering, Vol. 37, No. 2, 565–569, (1998) which are incorporated herein by reference in their entirety.

By way of example, f(x) denotes optical image to be stored in the memory of a computer. n(x) and b($\alpha$) denote two independent white sequences uniformly distributed on [0, 1], respectively. Herein x is a coordinate of the space domain, and a is a coordinate of the Fourier domain. In the encryption process, the key, e.g., the random phase function $\exp[j2\pi n(x)]$ is used in the space domain and the other key, e.g., the random phase function $\exp[j2\pi b(\alpha)]$ is used in the Fourier domain. The encrypted memory can be represented as:

$$\phi(x)=\{f(x)\exp[j2\pi n(x)]\}*\mu(x) \qquad \text{Equation 1}$$

where $\mu$ (x) is the inverse Fourier transform of $\exp[j2\pi b(\alpha)]$, and * denotes the convolution operation. In accordance with the present invention, the data image can only be decrypted when a corresponding key, i.e., $\exp[-j2\pi b(\alpha)]$, is used for the decryption. It will be appreciated that Equation 1 is for a single encrypted signal, whereby a summation of a plurality of such signals would constitute an encrypted memory. Further, while the random phase function is described herein as a generally uniformly distributed white sequence, it is within the scope of the present invention that it is any random distribution, statistical distribution or other unknown distributions.

To decrypt the memory, the Fourier transform of the encrypted memory $\phi(x)$ is multiplied by the decoding mask $\exp[-j2\pi b(\alpha)]$. This causes the encoding phase function $\exp[j2\pi b(\alpha)]$ to be canceled out by the decoding mask $\exp[-j2\pi b(\alpha)]$ that serves as the key for decryption. The decoded image is then inverse Fourier transformed to the space domain. Therefore, the original data image f(x) can be recovered in the space domain. If the stored image is positive, the phase function $\exp[j2\pi n(x)]$ is removed by an intensity sensitive device, such as a video camera. More specifically, $|f(x)|^2$ is obtained, when f(x) has a positive pixel value, knowing $|f(x)|^2$ is equivalent to knowing f(x) whereby the original data image is obtained, as is readily apparent to one of ordinary skill in the art. Alternatively, the decoded image in the space domain is multiplied by a complex conjugate of the original mask, i.e., $\exp[-j2\pi n(x)]$, which will provide the original data image f(x). This alternative is required when f(x) is not positive or real. It will be appreciated that the images not decrypted remain stationary white background noise. Further, while a Fourier transform is described herein it is within the scope of the present invention that a Fresnel transform may be employed. Moreover, when the transformer is unknown, it may also serve as a key.

Since the encrypted image described above is complex, both the amplitude and the phase of the information need to be displayed. Such can be avoided by using holograms. However, for real-time information processing it is preferred that spatial light modulators be used, although simultaneous control of phase and amplitude is difficult. In view of this difficulty, partial information of the encrypted image is used herein for further optical processing. More specifically, the amplitude or the phase information of the encrypted image are used. The phase-only information $\phi_\psi(x)$ of the encrypted image is expressed as:

$$\varphi_\psi(x) = \frac{\varphi(x)}{|\varphi(x)|} \qquad \text{Equation 2}$$

where $\phi(x)$ is the encrypted image. The amplitude-only information $\phi_A(x)$ of the encrypted image is expressed as:

$$\phi_A(x)=|\phi(x)| \qquad \text{Equation 3}$$

Figure 1B:
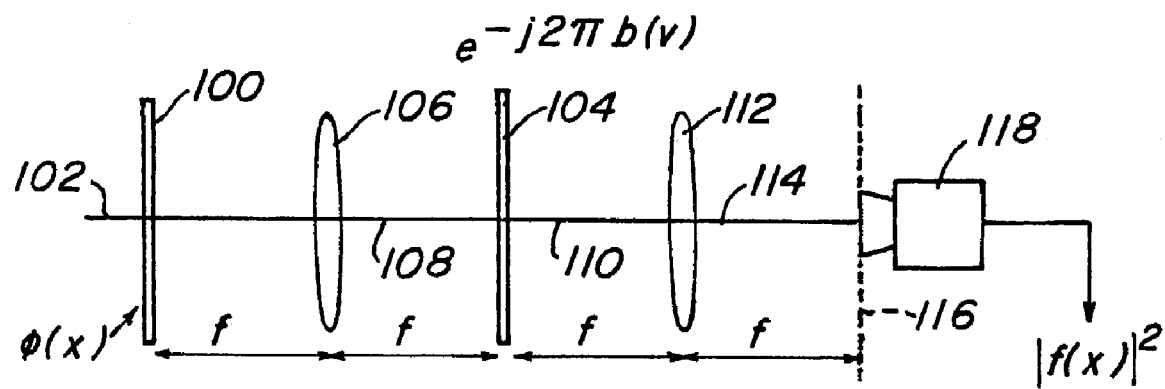
FIG. 1B is a schematic diagram of an optical assembly for use in the decryption technique of the present invention.

Referring to FIGS. 1A and B, an example of an optical assembly for use in the encryption (FIG. 1A) and decryption (FIG. 1B) technique with one dimensional functions is generally shown. In the memory recording process, the data image f(x) to be encrypted is placed at an input plane 70 and a random phase mask having a one dimensional function, i.e., $\exp[j2\pi n(x)]$, is attached to it. A Fourier transform of the product of the image and the random phase function is obtained at a Fourier plane 72 by a Fourier transform lens 74, i.e., a beam 76. The Fourier transform of this product (beam 76) is multiplied by another random phase mask having a one dimensional function, i.e., $\exp[j2\pi b(v)]$, which is placed at plane 72, resulting in a beam 80. Taking another Fourier transform of beam 80 by a Fourier transform lens 82, the encrypted image data $\phi(x)$ is obtained at a plane 86. An optical recording media is placed at plane 86, whereby a holographic optical memory is obtained.

To decrypt the memory $\phi(x)$, a key, which is complex conjugate of the white random sequence for the encryption, is needed. The encrypted memory is placed at an input plane 100, FIG. 1B, and is within the path a generally coherent light beam 102. A Fourier transform of the encrypted image $\phi(x)$ is obtained at a plane 104 by a Fourier transform lens 106, i.e., a beam 108, where it is multiplied by a decoding phase mask having a one dimensional function, i.e., $\exp[-j2\pi b(v)]$, that is the complex conjugate of the function of random coding phase mask, i.e., $\exp[j2\pi b(v)]$, resulting in a beam 110. Taking another Fourier transform of beam 110 by a Fourier transform lens 112, the original (decrypted) image data (beam 114) is obtained at an output plane 116 by detector (e.g., a one dimensional CCD camera or array) 118, whereby the first random phase modulation, i.e., exp[j2πn(x)], is removed, as described hereinabove. It will be appreciated that without this key, the encrypted image can not be recovered. Further, the encryption process of the present invention can be done optically, as described above, or electronically. This process of encryption and decryption being more fully described in co-pending, parent, U.S. patent application Ser. No. 08/595,893, entitled Method and Apparatus For Encryption, filed Feb. 6, 1996, which is incorporated herein by reference in its entirety.

Referring now to FIGS. 2A and 2B, a binary image of a text (FIG. 2A) and a facial image which is a 256 levels gray scale image (FIG. 2B) are shown. These images are 512×512 pixels. In this example, the images of FIGS. 2A and 2B have been encrypted using two independent white sequences, as described above in EQUATION 1. Attempted recovery (decryption) of the images using amplitude-only information is shown in FIGS. 2C and 2D, wherein it is clearly shown that the original images were not recovered from the amplitude-only information. Recovery (decryption) of the images using phase-only information is shown in FIGS. 2E and 2F, wherein it is clearly shown that good quality images of the original images were recovered.

In evaluating the quality of these recovered images, the decrypted images (FIGS. 2E and 2F) are compared with their original images (FIGS. 2A and 2B). Since any image sensor such as a CCD camera measures the intensity of the output, the final output is measured by the absolute value of the image |f(x)|, where f'(x) is the decrypted image. Thus, the error Er is defined as a metric to compare a decrypted image with an original input image:

$$Er = E_x\{|f'(x)| - f(x)\}^2 \quad \text{Equation 4}$$
$$= \frac{1}{N}\Sigma(|f'(x)| - f(x))^2$$

where f(x) is the original image, N is the number of pixels of the original image, and $E_x\{|f'(x)|-f(x)\}$ is the spatial averaging over the entire image. The error Er, as calculated from EQUATION 4, in this example is 0.004 for the text image (FIG. 2E) and 0.0003 for the face image (FIG. 2F). In view of the foregoing, it appears that the phase information of the encrypted image is the critical data to be used for decryption. Further, as described above, the phase-only information can easily be implemented in an optical system.

In accordance with the present invention, binarization of the encrypted image is introduced to further improve the encryption process. The encrypted image is binarized (see, Jain, A., "Fundamentals of Digital Image Processing" Prentice-Hall, 1989 and Pratt, W., "Digital Image Processing", Wiley, 1991, both of which are incorporated by reference in their entirety) since the optical implementation of a binary image is much easier than the implementation of a complex image.

Figure 3A:
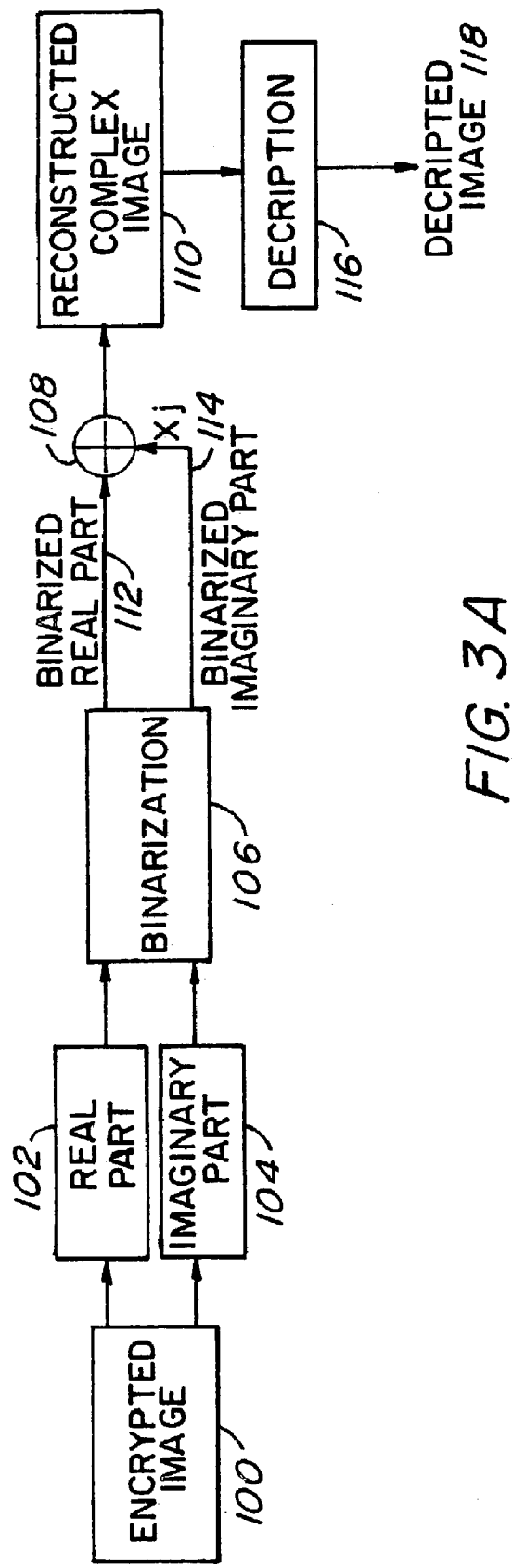
FIG. 3A is a block diagram of the decryption process from the binarized reconstructed complex image in accordance with the present invention.

Referring now to FIG. 3A, the encrypted image φ(x) 100 can be expressed in terms of a real part 102 and an imaginary part 104 as:

$$\phi(x) = \phi_R(x) + j\phi_I(x), \quad \text{Equation 5}$$

where $\phi_R(x)$ is the real part of φ(x) and $\phi_I(x)$ is the imaginary part of φ(x). In a first embodiment the real part and the imaginary part of the encrypted image are binarized 106 and then combined 108 to form a complex image $\bar{\phi}(x)$ 110, where $\bar{\phi}(x)$ denotes a binarized version of φ(x), with a binary real part 112 and a binary imaginary part 114 as follows:

$$\bar{\phi}(x) = \bar{\phi}_R(x) + j\bar{\phi}_I(x), \quad \text{Equation 6}$$

where $$\bar{\phi}_R(x) = \begin{cases} 1 & \text{if } \text{Re}[\phi(x)] > \text{Median}\{\text{Re}[\phi(x)]\} \\ -1 & \text{if } \text{Re}[\phi(x)] < \text{Median}\{\text{Re}[\phi(x)]\} \end{cases}$$

$$\bar{\phi}_I(x) = \begin{cases} 1 & \text{if } \text{Im}[\phi(x)] > \text{Median}\{\text{Im}[\phi(x)]\} \\ -1 & \text{if } \text{Im}[\phi(x)] < \text{Median}\{\text{Im}[\phi(x)]\} \end{cases}$$

Figures 4A, 4B:
FIG. 4A is an imaged decrypted from binarized reconstructed complex image of the image of FIG. 2A in accordance with the present invention.
FIG. 4B is an image decrypted from binarized reconstructed complex image of the image of FIG. 2B in accordance with the present invention.

$\bar{\phi}(x)$, defined in EQUATION 6, is referred to as the reconstructed complex image 110. This complex image 110 is then decrypted 116, as described above, to provide a decrypted image 118. Examples of the decryption of binarized encrypted images in accordance with FIG. 3A are shown in FIGS. 4A and B (of original images shown in FIGS. 2A and B, respectively). The error Er, as calculated from EQUATION 4, in this example was 0.009 for the text image (FIG. 4A) and 0.001 for the face image (FIG. 4B). Accordingly, good quality images were obtained for these images.

Figure 3B:
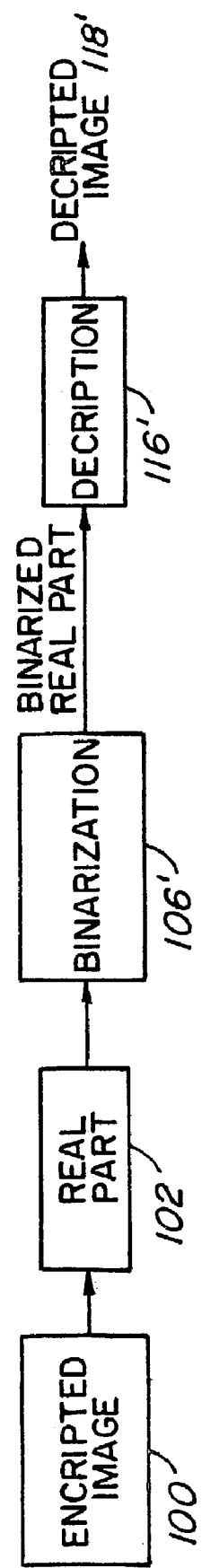
FIG. 3B is a block diagram of the decryption process from the binarized phase-only information of the encrypted image in accordance with the present invention.

Referring now to FIG. 3B, the encrypted image φ(x) can also be expressed in polar form as:

$$\phi(x) = \phi_A(x)\phi_\psi(x), \quad \text{Equation 7}$$

where $\phi_\psi(x)$ is the phase part of φ(x) and $\phi_A(x)$ is the amplitude part of φ(x), as defined in EQUATIONS 2 and 3, respectively. The binary phase encrypted image can be expressed as:

$$\bar{\phi}_\psi(x) = \begin{cases} 1 & \text{if } \text{Re}[\phi(x)] \geq 0 \\ -1 & \text{if } \text{Re}[\phi(x)] < 0 \end{cases} \quad \text{Equation 8}$$

Figures 5A, 5B:
FIG. 5A is an image decrypted from the binarized phase-only information of the decrypted image of the image of FIG. 2A in accordance with the present invention.
FIG. 5B is an image decrypted from the binarized phase-only information of the decrypted image of the image of FIG. 2B in accordance with the present invention.

Accordingly, only the real part of the encrypted image is binarized 106' providing the binary phase encrypted image $\bar{\phi}_\psi(x)$, as defined in EQUATION 8. This binary phase encrypted image is then decrypted 116', as described above, to provide a decrypted image 118'. Examples of the decryption of binarized encrypted images in accordance with FIG. 3B are shown in FIGS. 5A and B (of original images shown in FIGS. 2A and B, respectively). The error Er, as calculated from EQUATION 4, in this example was 0.02 for the text image (FIG. 5A) and 0.002 for the face image (FIG. 5B). It is apparent from the FIGURES that the recovered images obtained using the binarized phase information of the encrypted image are of lesser quality than the images decrypted from the reconstructed complex image. However, this phase-only embodiment uses less information and is easier to implement using spatial light modulators, other displays, or recording media such as printing the binary or phase only encrypted data.

The quality of these recovered images can be improved by further processing, either optically or digitally. By way of example, an image is further processed by filtering, such as a lowpass filter and/or a spatial averaging filter (see generally, Li H.-Y., Y. Qiao, and D. Psaltis, "Optical network for real-time face recognition", Applied Optics, 32, 5026–5035, 1993 and Jain, A., "Image Enhancement" (p. 244), in Fundamentals of Digital Image Processing, Eds., Prentice-Hall, 1989, both of which are incorporated herein by reference in their entirety).

FIGS. 6A and B show decrypted images of the original image of FIG. 2A which were obtained using a lowpass filter of bandwidth (N/2)×(N/2) pixels, applied to the decryption of a binarized phase-only image, as described above (EQUATION 8), and a binarized reconstructed complex image, as described above (EQUATION 6), respectively. The error Er, as calculated from EQUATION 4, was 0.06 for the binarized phase-only image (FIG. 6A) and 0.06 for the binarized reconstructed complex image (FIG. 6B). The edges of the characters in these images are blurred due to the removal of the high frequencies of the image. FIGS. 6C and D show decrypted images of the original image of FIG. 2A which were obtained using a spatial averaging filter of length 3×3 pixels for the binarized phase-only image, as described above (EQUATION 8), and the binarized reconstructed complex image, as described above (EQUATION 6), respectively. The error Er, as calculated from EQUATION 4, was 0.04 for the binarized phase-only image (FIG. 6C) and 0.02 for the binarized reconstructed complex image (FIG. 6D). Spatial averaging filtering removes noise more efficiently, but it introduces more blur than lowpass filtering.

The same processing was applied to the original image of FIG. 2B. The error Er, as calculated from EQUATION 4, with lowpass filtering was 0.009 for the binarized phase-only image and 0.007 for the binarized reconstructed complex image. The error Er, as calculated from EQUATION 4, with spatial averaging filtering (3×3 pixels) was 0.008 for the binarized phase-only image and 0.005 for the binarized reconstructed complex image. The spatial averaging filter removes more noise and gives better results than the ideal lowpass filtering. Spatial averaging filtering is better adapted to the processing of gray scale facial images since the human vision can easily recognize a lightly blurred image (as opposed to text).

While the above described embodiments provide examples of encryption/decryption of a specific type of information, it is within the scope of the present invention that such information includes optical images, digitized images, one-dimensional data, two-dimensional data, multi-dimensional data (e.g., color, wavelength) electrical signals or optical signals. Further, while the above described embodiments provide examples of encryption/decryption of a single image, it is within the scope of the present invention that each of the systems described herein is equally applicable to a plurality of images.

While this example is illustrated optically such can easily be accomplished electronically as is readily apparent to one of ordinary skill in the art. Further, while a one dimensional application has been described two dimensional applications are within the scope of the present invention, such as described in U.S. patent application Ser. No. 08/595,873.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of encryption and decryption comprising the steps of:
   encrypting original information to generate encrypted information;
   binarizing at least a part of said encrypted information to generate binarized encrypted information, said binarizing at least said part of said encrypted information comprises binarizing at least one of a real part and an imaginary part of said encrypted information, said binarized encrypted information is expressed as $$\overline{\varphi_R}(x) = \begin{cases} 1 & \text{if } \text{Re}[\varphi(x)] > \text{Median}\{\text{Re}[\varphi(x)]\} \\ -1 & \text{if } \text{Re}[\varphi(x)] < \text{Median}\{\text{Re}[\varphi(x)]\} \end{cases}$$

for said real part, and $$\overline{\varphi_I}(x) = \begin{cases} 1 & \text{if } \text{Im}[\varphi(x)] > \text{Median}\{\text{Im}[\varphi(x)]\} \\ -1 & \text{if } \text{Im}[\varphi(x)] < \text{Median}\{\text{Im}[\varphi(x)]\} \end{cases}.$$

for said imaginary part; and
   decrypting said binarized encrypted information to provided decrypted information indicative of said original information.

2. The method of claim 1, wherein the original information comprises optical images.

3. A method of encryption and decryption comprising the steps of:
   encrypting original information to generate encrypted information;
   binarizing at least a part of said encrypted information to generate binarized encrypted information, said binarizing at least said part of said encrypted information comprises binarizing a phase part of said encrypted information, said binarized encrypted information expressed as $$\overline{\varphi_\psi}(x) = \begin{cases} 1 & \text{if } \text{Re}[\varphi(x)] \geq 0 \\ -1 & \text{if } \text{Re}[\varphi(x)] < 0 \end{cases}$$

for said phase part; and
   decrypting said binarized encrypted information to provided decrypted information indicative of said original information.

4. The method of claim 3, wherein the original information comprises optical images.

5. A method of encryption and decryption comprising the steps of:
   encrypting original information to generate encrypted information;
   binarizing at least a part of said encrypted information to generate binarized encrypted information, said binarizing at least said part of said encrypted information comprises binarizing at least one of a real part and an imaginary part of said encrypted information, said binarized encrypted information is expressed as $$\overline{\varphi_R}(x, y) = \begin{cases} 1 & \text{if } \text{Re}[\varphi(x, y)] > \text{Median}\{\text{Re}[\varphi(x, y)]\} \\ -1 & \text{if } \text{Re}[\varphi(x, y)] < \text{Median}\{\text{Re}[\varphi(x, y)]\} \end{cases}$$

for said real part, and $$\overline{\varphi_I}(x, y) = \begin{cases} 1 & \text{if } \text{Im}[\varphi(x, y)] > \text{Median}\{\text{Im}[\varphi(x, y)]\} \\ -1 & \text{if } \text{Im}[\varphi(x, y)] < \text{Median}\{\text{Im}[\varphi(x, y)]\} \end{cases}.$$

for said imaginary part, and decrypting said binarized encrypted information to provided decrypted information indicative of said original information.

6. The method of claim 5, wherein the original information comprises optical images.

7. A method of encryption and decryption comprising the steps of:

encrypting original information to generate encrypted information;

binarizing at least a part of said encrypted information to generate binarized encrypted information, said binarizing at least said part of said encrypted information comprises binarizing a phase part of said encrypted information, said binarized encrypted information expressed as $$\overline{\varphi_\psi}(x,y) = \begin{cases} 1 & \text{if } \operatorname{Re}[\varphi(x,y)] \geq 0 \\ -1 & \text{if } \operatorname{Re}[\varphi(x,y)] < 0 \end{cases}$$

for said phase part; and decrypting said binarized encrypted information to provided decrypted information indicative of said original information.

8. The method of claim 7, wherein the original information comprises optical images.

* * * * *